US005527494A

United States Patent [19]
Weinberg et al.

[11] Patent Number: 5,527,494
[45] Date of Patent: Jun. 18, 1996

[54] APPARATUS FOR LIQUID-GAS CONTACT

[75] Inventors: Joseph Weinberg, Netanya; Benjamin Sekely, Rishon LeZion, both of Israel

[73] Assignee: Orniat Turbines (1965) Ltd., Yavne, Israel

[21] Appl. No.: 261,223

[22] Filed: Jun. 15, 1994

Related U.S. Application Data

[63] Continuation of Ser. No. 480,045, Feb. 14, 1990, abandoned.

[30] Foreign Application Priority Data

Feb. 24, 1989 [IL] Israel ........................................ 89404

[51] Int. Cl.$^6$ ............................ B01D 47/06; B01D 1/20

[52] U.S. Cl. .................... 261/36.100; 55/244; 159/4.01; 159/4.03; 159/4.07; 159/48.1; 239/127; 239/138; 261/116

[58] Field of Search ................................ 159/48.1, 4.01, 159/4.07, 4.03, 4.08, 4.2, 901; 202/267.1, 236; 261/36.1, 116; 55/244; 239/127, 131, 138; 134/108, 198; 203/4, 86, 90

[56] References Cited

U.S. PATENT DOCUMENTS

| | | | |
|---|---|---|---|
| 2,678,199 | 5/1954 | Koch | 261/36.1 |
| 2,733,054 | 1/1956 | Van Ackeren | 261/36.1 |
| 2,840,182 | 6/1958 | Coulter et al. | 261/36.1 |
| 3,622,074 | 5/1970 | Frohwerk | 261/DIG. 79 |
| 3,637,136 | 1/1972 | Bok | 239/125 |
| 3,674,153 | 7/1972 | Gomez et al. | 210/409 |
| 3,797,204 | 3/1974 | Cavatassi | 261/116 |
| 3,896,004 | 7/1975 | Rodgers | 159/DIG. 31 |
| 4,038,129 | 7/1977 | Wreszinski | 159/4.09 |
| 4,077,849 | 3/1978 | Ziehm, Jr. | 202/205 |
| 4,089,120 | 5/1978 | Kozischek | 34/12 |
| 4,145,384 | 3/1979 | Wagaman et al. | 261/36.1 |
| 4,246,242 | 1/1981 | Butler et al. | 159/48.1 |
| 4,352,392 | 10/1982 | Eastman | 165/104.25 |
| 4,430,155 | 2/1984 | Kozischek et al. | 159/48.1 |
| 4,477,492 | 10/1984 | Bergna et al. | 427/219 |
| 4,564,480 | 1/1986 | Kamelmacher | 261/36.1 |
| 4,573,490 | 3/1986 | Kaletsky | 261/36.1 |
| 4,666,561 | 5/1987 | DuFresne | 159/48.2 |
| 4,704,189 | 11/1987 | Assaf | 159/48.2 |
| 4,732,585 | 3/1988 | Lerner | 95/221 |
| 4,742,682 | 5/1988 | Assaf et al. | 60/641.1 |
| 4,808,303 | 2/1989 | Edwards et al. | 210/153 |
| 4,945,854 | 8/1990 | Nicola, Jr. et al. | 425/100 |

FOREIGN PATENT DOCUMENTS

| | | |
|---|---|---|
| 351143 | 1/1990 | European Pat. Off. . |
| 2555469 | 5/1985 | France . |

*Primary Examiner*—Virginia Manoharan
*Attorney, Agent, or Firm*—Donald M. Sandler

[57] ABSTRACT

An apparatus and a method for spraying a starting solution into a gaseous medium under certain conditions. The method includes the steps of a) supplying the starting solution by delivering means using a pump to spray head members and spraying the starting solution through the spray head members, each spray head member having a plurality of holes for producing droplets of substantially constant radius substantially independent of spray head operating pressure, and b) washing the spray head members connected to at least one starting solution supply conduit substantially at its surface and purging them from foreign material with starting solution in the supply conduit.

25 Claims, 3 Drawing Sheets

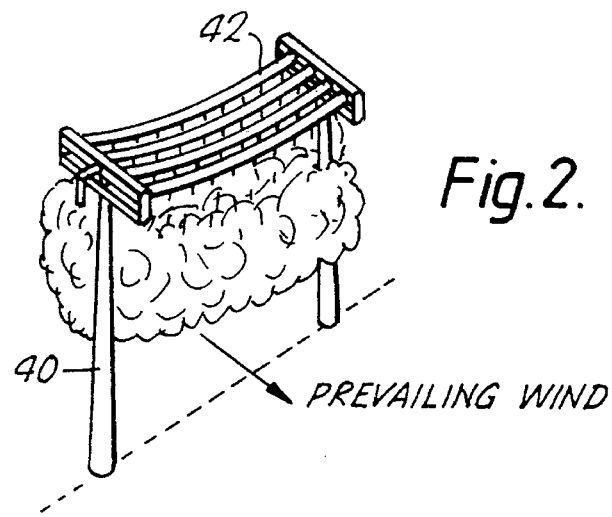
Fig.2.
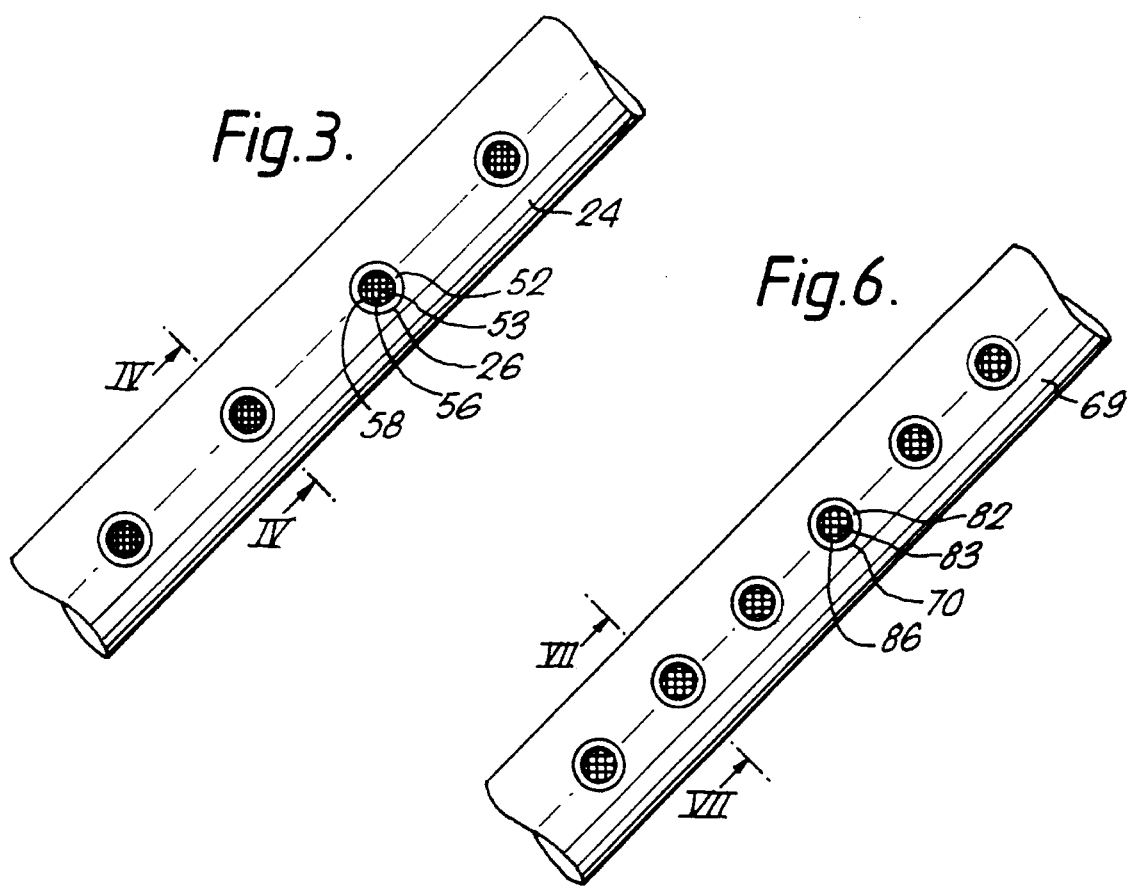
Fig.3.
Fig.6.
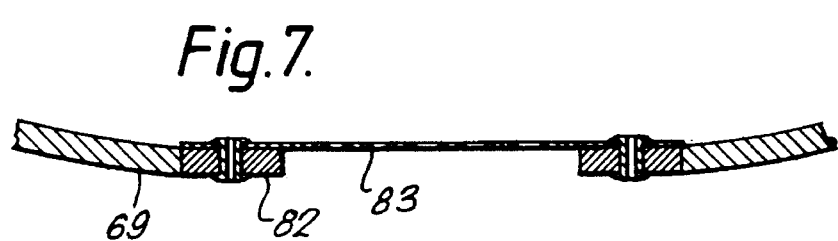
Fig.7.

APPARATUS FOR LIQUID-GAS CONTACT

This application is a continuation of application No. 07/480,045, filed Feb. 14, 1990, now abandoned.

TECHNICAL FIELD

This application relates to a method of and apparatus for exchanging heat between a liquid and a gaseous medium and more particularly is concerned with a method of and apparatus for evaporating and cooling a liquid.

BACKGROUND OF THE INVENTION

When evaporating or cooling a liquid or solution in a gaseous medium, the manner in which contact is made between the liquid and gas has been found to play prime importance in determining the efficiency of the processes. Conventionally, evaporating ponds containing a liquid have been used for many years to evaporate liquid or concentrate a solution, with solar radiation being used as the energy source and the liquid evaporated being released in the form of vapors to the free atmosphere. This has been common practice in several industrial and agricultural processes used for example in the production of salt, disposal of industrial waste, recovery of minerals and in potash production. In such methods and devices, however, the contact between the liquid being evaporated and the gaseous medium into which the vapors are released as well as the exposure of the liquid to the energy source is minimal since only the upper surface of the liquid present in the pond is exposed to the ambient air.

For example, when minerals are recovered using large-scale evaporating ponds, solar radiation absorbed by these ponds supplies latent heat of evaporation permitting the solution to become progressively concentrated. However, since the vapor pressure of the solution or brine, being small in comparison with fresh water at the same temperature, decreases with increasing concentration, evaporation is retarded as the solution concentration increases. Furthermore, as the temperature of the solution rises, the sensible and long-wave radiation flux from the pond increases to a level where it exceeds the latent heat flux that produces evaporation and brine concentration. Consequently, only a fraction of solar energy used in an evaporation pond is converted into useful latent heat flux.

On the other hand, when cooling a liquid, forced draft cooling towers and cooling spray ponds have conventionally been used in industrial processes such as in the condensers of electric power plants, etc. Also natural draft and atmospheric spray cooling towers have been used in several applications. Normally, pressure spray nozzles or spray heads which produce droplets with a spectrum of different droplet sizes are used to produce liquid droplets for exposing the liquid to the gaseous medium. Forced draft cooling towers have been found to consume considerable amounts of energy, mainly due to the fans used to supply air to the cooling towers while spray ponds have been found to suffer from, among other things, inefficient supply of air into the spray body and a loss of the liquid from the system as winds present cause droplets to drift to locations external to the spray pond area. Also, due to the fact that the droplets have a spectrum of different droplet sizes, much of the cooling potential of the liquid cannot be efficiently used. Furthermore, when such nozzles are used, foreign material and debris present in the cooling liquid quite often accumulate in the housing of the nozzles, frequently bringing about their malfunction and consequently requiring frequent maintenance, Such maintenance operations conventionally involve, among other things, the dismantling of the nozzles themselves in order to remove debris and material collected in the nozzle structure.

In U.S. Pat. No. 4,704,189, the disclosure of which is hereby incorporated by reference, a method of and apparatus for evaporating liquid from a solution is disclosed wherein a starting solution is concentrated to a desired end solution without the need to use external heat. This is achieved by contacting the starting solution with a gaseous medium under the conditions that the heat content of the starting solution in contact with the gaseous medium is smaller than the heat content of the gaseous medium and the duration of contact is such that most of the evaporation of liquid from the solution takes place under conditions of constant enthalpy. According to this patent, to obtain such conditions, the starting solution is exposed to the gaseous medium for a sufficient period of time by either spraying the solution into the gaseous medium using for example pressure nozzles, rotating discs or piezoelectric sprayers or by passing the gaseous medium through a matrix of filaments over which a thin film of the solution flows. When a spray is used, droplets of a radius not greater than 0.2 mm are preferred, with the spray nozzles being positioned such that the droplets travel in excess of 5 m. When spraying liquid into the gaseous medium in accordance with this patent, use of spray nozzles which produce droplets of different size would be very undesirable, since when carrying out the process in the open atmosphere, prevailing winds can cause the drift of many of the relatively small droplets out of the spray area and consequently bring about their loss from the system, causing possible contamination of the surrounding environment. Furthermore, use of conventional pressure nozzles for producing the required droplet spray is undesirable since relatively high pressures, conventionally greater than a few atmospheres, need to be used, bringing about a relatively high energy consumption and making an operating pressure of several tens of atmospheres necessary merely to double the quantity of liquid used. Also, since the operating pressure of such nozzles influences the size of the droplets produced, flexibility of operation is minimal, In addition, use of such nozzles quite often causes foreign material and debris to accumulate in their housing, quite frequently bringing about their malfunction. Consequent maintenance operations conventionally involve, among other things, the dismantling of the nozzles themselves in order to remove debris and material collected in the nozzle structure.

It is therefore an object of the present invention to provide a new and improved method of and apparatus for evaporating and cooling a liquid wherein the disadvantages as outlined are reduced or substantially overcome.

SUMMARY OF THE INVENTION

Accordingly, the present invention comprises a method of and apparatus for exchanging heat between a liquid and a gaseous medium wherein, in one form of the invention, a method of and apparatus for evaporating a liquid is provided and in another form of the present invention, a method of and apparatus for cooling a liquid is provided. When liquid is evaporated, liquid or starting solution is sprayed into a gaseous medium preferably under the conditions that the heat content of the starting solution in contact with the gaseous medium is smaller than the heat content of the gaseous medium, the duration of contact of the solution with the gaseous medium in the droplet shower formed by the droplets being such that most of the evaporation of liquid from the solution takes place under conditions of constant enthalpy with the vapor pressure of the gaseous medium being less than the vapor pressure of the liquid/gas interface of the end solution. In the present invention, these conditions are achieved by spraying the starting solution through preferably several perforated spray head members connected to at least one starting solution supply conduit substantially at its surface, the spray heads ensuring that the size of the spray droplets from which liquid is evaporated be substantially uniform, fixed or constant. A droplet radius is used which, on the one hand, is sufficiently small to permit almost all of the starting solution droplets to evaporate under conditions of constant enthalpy wherein almost all of the energy for evaporation is extracted from the gaseous medium surrounding the droplets, while on the other hand, is sufficiently large to substantially reduce or eliminate droplet drift away from the spray area, particularly important when the evaporation process is carried out in natural environments such as in the open air. The perforated spray head members used to produce the shower of starting solution droplets have a plurality of holes, the radii of which are preferably not less than 0.03 mm and the distance between the holes, preferably at least 0.6 mm, being such as to ensure the production of droplets of substantially uniform, equal or constant size in the gaseous medium. Virtually, all of the liquid mass is contained in droplets having a radius of being 0.8 and 1.2 of the nominal droplet radius. Since, in the present invention, the spray heads or members are positioned substantially at the surface of the starting solution supply conduit, little or minimal quantities of foreign material accumulates in their vicinity since starting solution flowing in the supply conduit continuously washes and purges them from foreign material, with residual solution together with any collected debris or material preferably transported via a suitable conduit to an auxiliary pond for disposal. Consequently, the necessity for maintenance operations is markedly reduced. However, if and when such maintenance needs to be carried out, the present invention also facilitates such operations, since the supply conduit together with the spray head members still connected thereto need merely be dipped into a suitable maintenance reservoir containing a liquid in order to remove accumulated debris or matter from the spray heads. Alternatively, pressurized water or liquid can be applied internally to the conduit or directly to the spray head members while they are still connected to the supply conduit.

When using the spray heads of the present invention, low operating pressures are achieved permitting the pressure used in appropriate flow control means for delivering the starting solution to the spray heads to be minimized, consequently minimizing energy consumption. Also in the present invention, the droplet size is substantially independent of spray head operating pressure. Preferably, a spray head operating pressure of less than three atmospheres is used. Also in accordance with the present invention, the spray heads are positioned in order to ensure that the mixing ratio in the droplet shower of the liquid to gas, measured in terms of kilograms of liquid per kilogram of gas, is substantially constant throughout the droplet shower and preferably less than 0.02.

When liquid is to be cooled, in accordance with the other form of the invention, the liquid is sprayed in the form of droplets into a gaseous medium under the conditions that the heat content of the liquid is larger than the heat content of the air and the mixing ratio m of the liquid to gas in the droplet shower formed, measured in terms of kilograms of liquid per kilogram of gas, is preferably not less than 0.1. In accordance with the present invention, such conditions are achieved by ensuring that the size of the droplets of the liquid to be cooled be substantially uniform or constant, the liquid being sprayed preferably through a plurality of perforated spray head members connected to at least one liquid supply conduit substantially at its surface, each spray head member having a plurality of holes the radii of which are preferably not less than 0.06 mm and the distance between the holes, preferably at least 0.6 mm, being such as to ensure the production of droplets of substantially uniform, equal or constant size in the gaseous medium. Virtually, all of the liquid mass is contained in droplets having a radius of between 0.8 and 1.2 of the nominal droplet radius. Since here also, the spray head members are connected substantially at the surface of the supply conduit, liquid in the supply conduit continuously purges or washes the members from foreign material, reducing their maintenance requirements. Such material is transported along the supply conduit with the liquid flowing therein and is preferably deposited together with residual liquid not exiting the spray heads into an auxiliary pond for disposal. Also here, the present invention simplifies maintenance operations if and when necessary, it merely being necessary to dip the supply conduit together with the connected spray head members into liquid contained in a suitable maintenance reservoir to remove accumulated debris. Alternatively, pressurized water or liquid may be applied to the spray head members or the interior of the conduit while the spray heads are still connected to the supply conduit. These spray heads operate at low pressures allowing the pressure used for delivering the liquid to the spray heads using flow control means to be minimized, consequently minimizing energy consumption. Here also, the droplet size is substantially independent of spray head operating pressure, with a spray head operating pressure of preferably less than two atmospheres being used. A droplet size is used which, on the one hand, is preferably sufficiently small to permit almost all of the droplets to cool and reach the required temperature, while on the other hand, is sufficiently large to substantially reduce or eliminate droplet drift away from the spray region, this being particularly important when the cooling process is carried out in natural environments such as in the open air. Furthermore, the spray heads are positioned such that a substantially constant liquid gas mixing ratio is achieved throughout almost all of the droplet shower, When using, for example, spray head members having holes of a radius of 0.12 mm and separated by a distance of 0.8 mm, a shower of droplets having a substantially uniform radii of approximately 0.23 mm is produced. Droplets of such uniform radii minimize possible spread or drift of the spray by ambient winds when the cooling process is carried out in the open air.

BRIEF DESCRIPTION OF THE DRAWINGS

Embodiments of the invention are described below by way of example, and with reference to the accompanying drawings wherein:

FIG. 2 is a perspective schematic of another embodiment showing the spraying of liquid into air for evaporating liquid using a plurality of shower lines;

FIG. 3 is a schematic showing an embodiment of spray head members used for spraying liquid into air for evaporating liquid in accordance with present invention;

FIG. 6 is a schematic showing an embodiment of spray head members used for spraying liquid into air for cooling liquid in accordance with present invention, and FIG. 7 is a cross-sectional view of a spray head member used for spraying liquid into air for cooling liquid in accordance with present invention.

DETAILED DESCRIPTION

Figure 1:
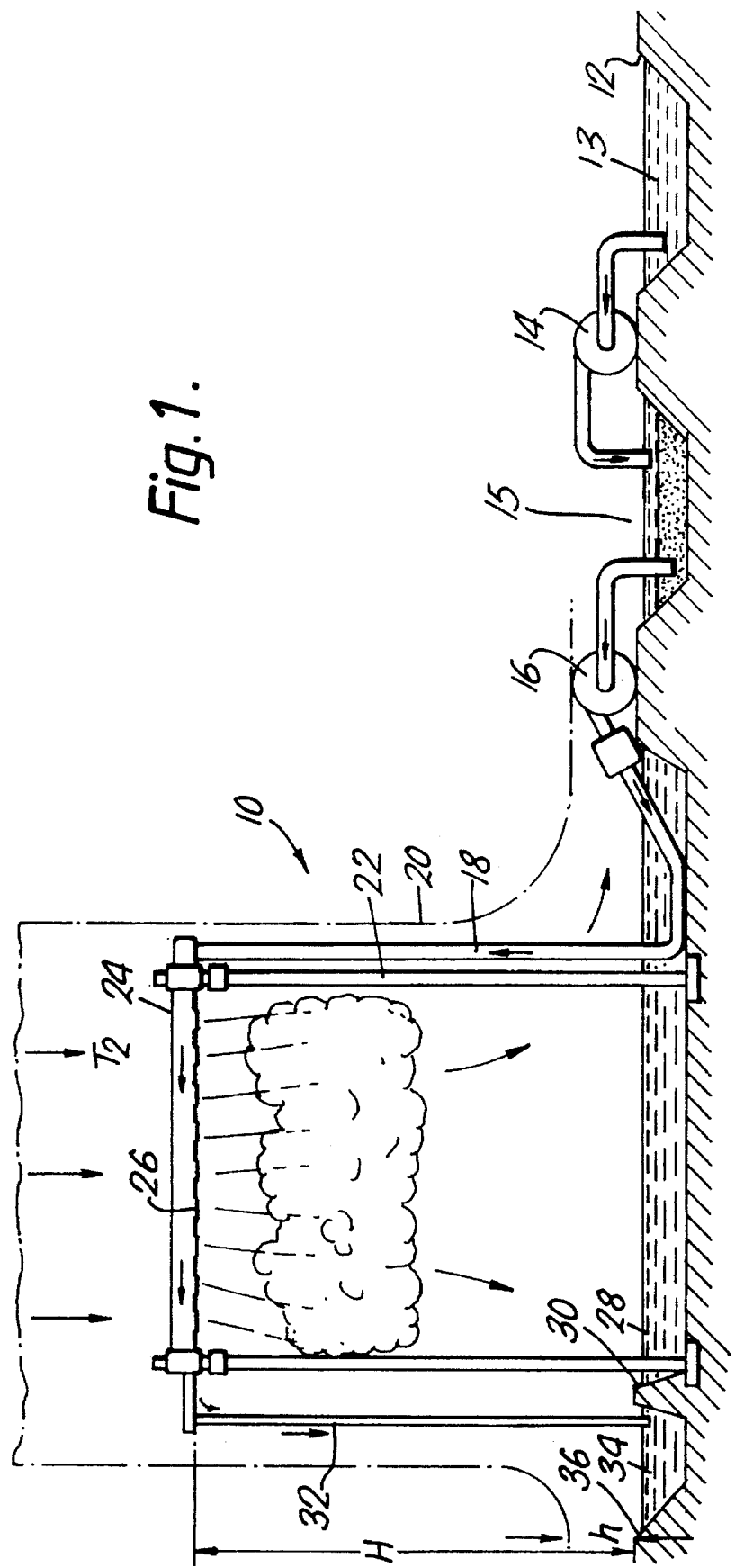
FIG. 1 is a schematic of one embodiment of the present invention showing the spraying of liquid into air for the purpose of evaporating the liquid.

Referring now to FIG. 1 of the drawings, reference numeral 10 designates apparatus, according to the present invention for evaporating liquid. Apparatus 10 includes a source of starting brine 13 contained in reservoir 12, for example the sea, and second reservoir 30, which represents a catch basin for receiving the end brine 28. Pump 14 is provided for supplying brine from reservoir 12, this brine being passed through a filter 15 for filtering out foreign material from the brine. Mechanical or sand filtration, as shown for example in FIG. 1 can be used. Subsequently the brine flows through starting brine supply means including vertically oriented conduit 18 and horizontally oriented conduit or header 24, supported by a plurality of towers 22, to spray heads or perforated members 26 connected to and positioned substantially at the surface of pipe 24 and located at an elevation H above the surface of brine in second reservoir 30. Spray heads 26 are chosen to produce droplets of a substantially equal or fixed, predetermined radius as described below, and are positioned to establish a spray shower having a mixing ratio measured in terms of kilograms of liquid per kilogram of air which is less than a predetermined value, as described below. Conduit 32 permits residual brine not sprayed through the spray heads to exit to auxiliary pond 36, excess brine flowing in conduit 24 continuously purging the perforated spray heads.

Figure 4:
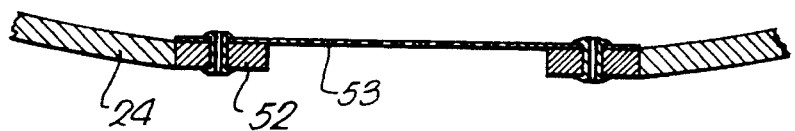
FIG. 4 is a cross-sectional view of a spray head member used for spraying liquid into air for evaporating liquid in accordance with present invention.

When the apparatus is operated, falling droplets produced by spray heads 26 from brine supplied by pump 14 via conduits 18 and 24 together with the increase in the density of the air due to its cooling, produce a drag force on the air and establish a downwardly flowing column of air 20 into which surrounding ambient air is entrained. When the droplets fall from spray heads 26 into reservoir 30, the density of the brine droplets increases, reaching the predetermined end point as the droplets enter the reservoir. By selecting the basic parameters of the system namely, the mixing ratio, droplet size and the height of the spray heads, the desired end brine will be produced in reservoir 30. If necessary or preferred, however, brine in reservoir 30 can be recycled through the spray shower. Brine flowing in conduit 24 is utilized to purge or continuously wash the perforated spray head members from any debris or foreign material, this brine collecting such material, with excess brine transporting it via conduit 32 to auxiliary pond 36. Thus, in the present invention, a quantity of brine exceeding the quantity of brine sprayed by the spray head members is supplied to brine supply conduit 24. Brine 34 or material in pond 36 can be periodically disposed of by suitable means. Such purging of the spray heads can be performed in the present invention, since the perforated spray head members, also shown in FIG. 3 are positioned substantially at the surface of conduit 24, see FIG. 4, allowing brine flowing in this conduit to continuously wash or purge the members from foreign material. In the prior art on the other hand, this could not be achieved since the spray nozzle heads used to spray the brine were connected to such a conduit via their housing, the housing itself presenting a trap for foreign material, causing such material to accumulate within the housing and bringing about the possible malfunction of such spray nozzles since little or almost no on-line purging of the spray surface occurred in such a configuration. Furthermore, in accordance with the present invention, the positioning spray head members 26 substantially at the surface of brine supply conduit 24 facilitates maintenance operation when and if need to be carried out, since conduit 24 together with spray head members 26 still attached thereto can simply be dipped into a suitable maintenance reservoir (not shown) containing a liquid to remove material or debris accumulated at the spray head members. If warranted, pressurized water or liquid can be applied to the attached spray head members in order to further dislodge accumulated material.

While the apparatus shown in FIG. 1 shows the perforated spray heads arranged in order to produce a line shower, spray heads 26 may be arranged, if preferred, to produce a cylindrical shower. Normally, a line shower will be preferred when apparatus shown in FIG. 1 is operated in the natural open atmosphere and where the prevailing winds have a preferential direction. In such cases, in order to intensify the spray shower produced, several spray lines can be used to advantage in a manner shown in FIG. 2. A plurality of towers 40 is erected in a direction that is normal to the direction of the prevailing wind and conduits 42 are strung between the towers in order to take advantage of the winds to introduce fresh, dry air into the shower volume thereby enhancing the evaporation and making the shower more effective. The brine to be concentrated is pumped through the conduits to the plurality of perforated spray heads through which sprays of dilute brine are introduced into the prevailing wind.

In order to ensure that the evaporation process proceeds under conditions of constant enthalpy when the vapors released from the droplets are absorbed by the air as the droplet temperature rises and the temperature of the air decreases while its humidity increases, it is recommended in U.S. Pat. No. 4,704,189 that the mixing ratio m be less than about 2%, the height of the spray heads be at least 5 m and the radius of the droplets be less than about 0.2 mm. Consequently, as explained in that patent, when brine is concentrated in the open air, sufficient time and space must be provided to ensure that liquid evaporates from the droplets under these prescribed conditions. Since the ambient air is subject to changes in speed and direction, a serious danger exists that droplets may drift away from that catch basin resulting in the loss of brine from the system and possible contamination of the surrounding environment. This is particularly the case when spray heads such as pressure nozzles producing droplets having a rather large size spectrum are used, since the small diameter droplets will be particularly liable to drift. Furthermore, the use of such spray heads is unadvisable from a different point of view, wherein large droplets produced therefrom will reach the catch area prior to having given up sufficient vapor in order to reach the required brine concentration. In order to overcome these problems, it is suggested in that patent to expose the brine to the air by presenting the brine to be concentrated as a thin film carried by many filaments, the filaments normally being in the form of a plurality of planar criss-crossed net of thin filaments. However, such a net presents resistance to the air flow, reducing the amount of air reaching the brine and thus lowering the intensity of the evaporation process.

According to the present invention, the apparatus disclosed also ensures that most of the evaporation process proceeds under conditions of constant enthalpy with droplet drift away from the catch basin being substantially reduced or almost eliminated without reducing the amount of air entering the evaporation process. This is accomplished by using spray heads 26 which ensure that the size of the droplets exiting the spray heads is substantially uniform or constant. These spray heads, being positioned substantially at the surface of the conduit which supplied the brine, also provide minimum maintenance as they are continuously purged by brine passing over them in the supply conduit, the residual purge brine exiting to auxiliary pond 36. Since, in accordance with the present invention, the radius of the droplets produced is substantially constant, the spray heads can be designed to produce droplets having a radius which, on the one hand is sufficiently small to permit almost all of the brine droplets to evaporate under conditions of constant enthalpy, reaching the required concentration as they enter the catch basin, while, on the other hand, being sufficiently large to substantially reduce or eliminate droplet drift away from the catch basin. Substantially, all of the liquid mass is contained in droplets having a radius of between 0.8 and 1.2 of the nominal droplet radius. Normally, the vapor pressure of the gaseous medium into which the droplets are sprayed should be less than the vapor pressure at the liquid/gas interface of the end solution in order to guarantee the evaporation of liquid. The evaporation of liquid is consequently vitally dependent on the extent and manner in which the liquid makes contact with the gaseous medium. To this end, the droplets produced by the spray heads of the present invention permit them to interact with the gaseous medium such that practically all of the heat and vapor transfers occurring as the vapors are released from the droplets and absorbed by the air take place under the condition that the latent heat flux due to evaporation of the liquid from the droplets is substantially equal to the sensible heat flux due to heating by the gaseous medium whereby the wet-bulb temperature at the liquid/gas interface is substantially constant and equal to the wet-bulb temperature of the gaseous medium. Also, the spray heads are positioned such that the brine-air mixing ratio of the droplet shower is substantially constant through the shower, preferably less than 0.02, the dimensions, including the height, H, of the shower being chosen to ensure that the residence time, t, of the air in the shower volume is greater than 0.1 $\tau$ and less than 10 $\tau$, preferably equal to $_{\tau}$, where $\tau$ is the time constant of the shower system and represents the time required for air temperature change in the shower to reach 37% of thermal head temperature difference, which is the difference between the ambient air temperature and the temperature of the liquid leaving the shower. In the present, H, the height of the shower and also the elevation at which the perforated spray heads are located above the surface of end brine 28 in reservoir 30 is preferably at least 10 meters, the spray heads being preferably positioned at a distance of approximately 700 mm from one another along the length of conduit 24. When several line showers are used as shown in FIG. 2, the distance between each line is preferably approximately 1 meter, the length of the line shower being preferably 100 meters.

Referring now to FIG. 3 and FIG. 4, an embodiment of several perforated spray heads as well as a cross-sectional view of a connected spray head member used in accordance with the aspect of the present invention for evaporating liquid from brine are shown wherein spray heads 26 are connected to conduit 24 by connecting members 52 thus connecting the perforated spray heads to the brine supply means as shown in FIG. 1. The perforated spray heads comprise perforated members 53 having a plurality of holes 56 for producing a spray of brine droplets of uniform or constant size which interact with the air in a manner described hereinbefore. While the size of holes 56 is chosen to produce droplets having a substantially constant radius sufficiently small to permit almost all of the brine droplets to evaporate under conditions of constant enthalpy, and, on the other hand, being sufficiently large to substantially reduce or eliminate droplet drift away from the catch basin, the size of holes 56 is additionally chosen such that any solid material remaining in the liquid to be evaporated will not cause blockage of the spray heads. Furthermore, the distance between the holes is also selected to ensure production of liquid droplets having substantially uniform or constant size. Preferably, the radii of holes 56 is not less than about 0.03 mm, with the distance between the holes on member 56 being at least 0.6 mm. Member 53 shown in FIG. 3 is a perforated sheet or plate of material, preferably being a metal mesh screen or metal wire cloth screen. Although quite often the holes or perforations in the mesh or metal screens may be rectangular or square in shape, droplets of constant radius will be produced. In the present embodiment, perforated spray head member 53 is mounted substantially at the surface of conduit 24 using connecting member 52, the perforated member being connected to the internal surface of member 52 with rivets. Connecting members 52 are oval annulus sections preferably produced by cutting out oval sections from conduit 24 itself and further removing a central oval portion from these sections. After members 56 have been riveted to the connecting members, these are remounted in conduit 24 by welding them to the periphery of the holes in the conduit. Alternatively, if preferred, other methods of positioning the perforated members substantially at the surface of conduit 24 can be employed. For example, the perforated members may be glued to connecting members 52 or fixed in internally extruded portions of conduit 24 adjacent to openings therein, the surface of the perforated member present in these openings acting as the spray head surface. Preferably, the radius of the opening 58 in which perforated members 26 presents a free surface to the brine flowing in conduit 24 for producing a spray is approximately 40 mm, this surface containing approximately 1500 holes or orifices within a radius of 17 mm. Conduit 24 and consequently connecting members 52 are preferably construed from polyethylene and polypropelene. Preferably the outer radius of conduit 24 is at least 25 mm.

Spray heads 26 operate at minimal pressures, no greater than 3 atmospheres, their operating pressure having little influence on the size of droplets produced. Preferably, an operating pressure of between 0.2–1.0 atmospheres is used. Consequently, the pump used to supply brine to the spray heads can operate at relatively small pressures and minimize energy consumption. Also flexibility of operation is achieved by using such spray heads since the brine flow rate can be changed when necessary by increasing the spray head operating pressure, without altering the basic characteristics of the spray shower, in particular the droplet radius and mixing ratio. For example, if the ambient wind velocity increases, larger quantities of fresh, dry air are made available for the evaporation process and consequently the brine flow rate can be increased by increasing the spray head operating pressure permitting larger quantities of brine to be concentrated while at the same time maintaining a constant droplet radius.

In an example of specific apparatus operating in accordance with the present invention, spray members having apertures of 0.06 mm radius and separated by a distance of 0.8 mm were found to produce droplets having a nominal radius of 0.11 mm.

Furthermore, while the above description relates to evaporating liquid from brine, including sea, ocean water and brackish water, this aspect of the present invention, shown for example in FIGS. 1 to 3 above and described also in relation thereto, is generally applicable to evaporating liquid from other liquids. For example, industrial, domestic and agricultural waste liquids and solutions as well as surplus surface waters may have liquid evaporated from them using the methods and apparatus of the present invention. Preferably, member 53 is constructed from material which exhibits non-corrosive behaviour to the liquids from which the spray shower is produced. Such materials include titanium, stainless steel, teflon and other plastics such as polyvinylidene fluoride. If preferred, laser beams or photochemical etching techniques can be used to produce the perforated members, with holes 56 being produced by, for example, a laser beam. Also needle punching can be used to produce the hole in these members. The thickness of member 53 is preferably no greater than 0.2 mm when stainless steel or titanium is used, or preferably at least 1 mm when teflon or other plastics are used as the construction material of this member.

Figure 5:
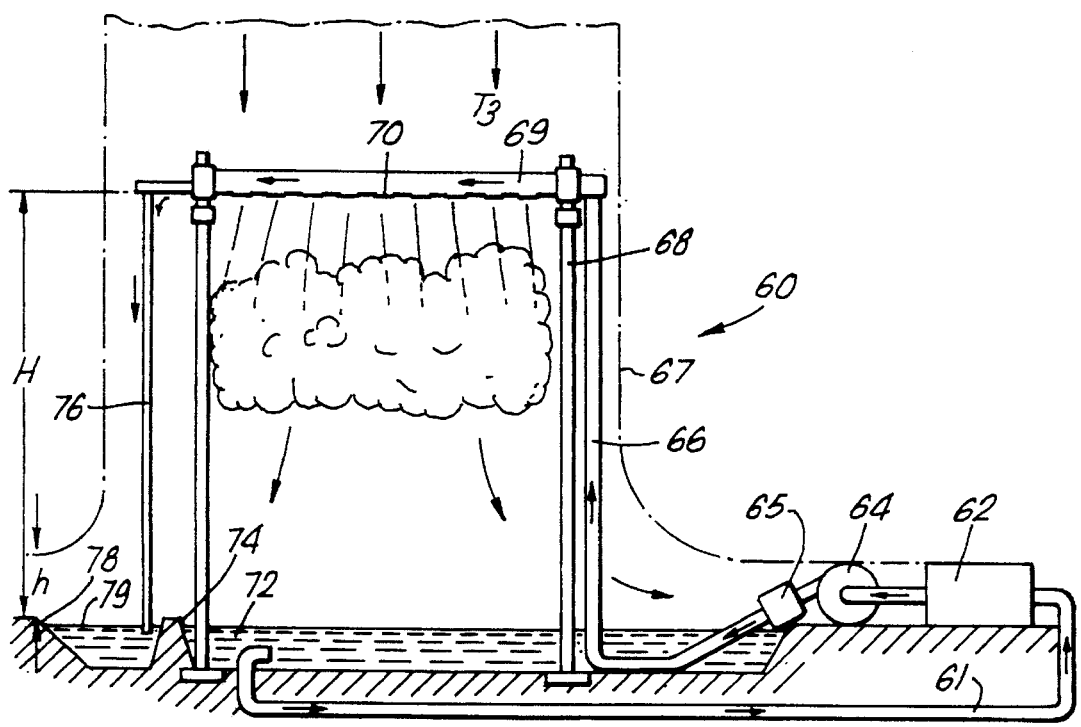
FIG. 5 is a schematic of a further embodiment of the present invention showing the spraying of liquid into air for the purpose of cooling a liquid.

In the other form of the invention, apparatus analogous to that described in relation to FIG. 1, shown in FIG. 5 is used, reference numeral 60 designating apparatus for cooling a liquid. Pump 65 is provided for drawing water through condenser 62 where it absorbs heat, this water being supplied through a filter 65 and water supply means including piping 66 and 69, supported by plurality of towers 68, to perforated spray head members 70 for producing droplets. These spray head members are mounted substantially on the surface of conduit 69 and located at an elevation H above the surface of second reservoir 74 which acts as a catch basin for receiving cooled water droplets. Here also, the spray heads are chosen to produce droplets of a substantially equal or fixed, predetermined radius in a manner described below, the spray heads being positioned so as to establish a spray shower having a mixing ratio measured in terms of kilograms of liquid per kilogram of air which is less than a predetermined value, also described below. However, in accordance with this aspect of the present invention, spray heads 70 are positioned and operated such that the cooling of the water occurs under the conditions, as explained below, in which both the enthalpy of the water and the air in the shower change quite substantially wherein the latent heat flux due to evaporation is large compared with the sensible heat flux supplied by the air bringing about the cooling of the water contained in the droplets. Thus, the cooling of the water is vitally dependent on the extent and manner in which the water makes contact with the gaseous medium. Here also, water flowing in supply conduit 69 to which the spray head members are connected serves to purge the spray heads from foreign material, such material being washed along this conduit, with the water containing this material exiting to auxiliary pond 78 via conduit 76. Conduit 61 is provided for resupplying cooled water 72 to condenser 62 from reservoir 74 where heat is absorbed, completing the cooling cycle. Although not shown in the figure, makeup water will usually be supplied to water in reservoir 74 in order to make up for water lost from the system by, for example, evaporation.

In operation, droplets produced by spray heads 70 from water supplied by pump 64 from condenser 62 via conduits 66 and 69 bring about a drag force on the air due to the falling droplets themselves and the decrease in their temperature due to their cooling as well as due to the increase in the density of the air establishing a downwardly flowing column of air 67 into which surrounding ambient air is entrained. By choosing the appropriate parameters of the system, in particular the liquid-air mixing ratio and droplet size, as described below, the droplets will reach the desired cooling water temperature as they enter the catch basin 74. Cooled water 72 contained in basin 74 is drawn by pump 65 through conduit 61 to condenser 62, where it absorbs heat and thus completes the cooling cycle. Water in conduit 69 continuously purges and washes foreign material away from the spray head members 70 mounted substantially on the surface of conduit 69, such material being transported to auxiliary pond 78 via conduit 76 by residual liquid. When convenient, water or material contained in this auxiliary pond is disposed of by suitable means. Thus, here also, a quantity of liquid in excess of that to be sprayed by the spray head members is supplied to supply conduit 69. Also here and as explained in connection with the previously described form of the present invention, maintenance operations are also greatly simplified since the spray head members are mounted substantially at the surface of water supply conduit 69.

The apparatus shown in FIG. 5 shows the spray heads arranged in order to produce a line shower. However, also in this embodiment, spray heads 70 may be arranged, if preferred, to produce a cylindrical shower. However, normally, a line shower will be preferred when apparatus shown in FIG. 5 is operated in the natural open atmosphere and where the prevailing winds have a preferential direction. In such case, in order to intensify the spray shower produced, several spray lines can be used to advantage in a manner analagous to that shown in FIG. 2 wherein the spray lines are erected in a direction normal to the prevailing wind direction, thus taking advantage of the winds to introduce fresh, dry air into the shower, thereby enhancing the cooling process and making the shower more effective.

Accordingly, the apparatus disclosed ensures that most of the cooling process proceeds under the conditions in which the enthalpy of the water and the air in the shower change by a substantially large extent wherein the latent heat flux due to evaporation is large compared with the sensible heat flux supplied by the air bringing about the cooling of substantially all of the water contained in the droplets to the required temperature as the droplets enter the reservoir 74 while at the same time substantially reducing the drift of the droplets away from reservoir 74 acting as a catch basin for the cooled droplets. This is achieved, in the present invention, by using spray heads 70 designed and positioned to produce a shower of droplets having a uniform or substantially constant liquid-air mixing ratio, m. A droplet radius, r, is consequently used which, on the one hand, is sufficiently small to permit almost all of the droplets to cool and reach the required temperature as they enter the catch basin, while, on the other hand, is sufficiently large to substantially reduce or eliminate droplet drift.

It has been found that by designing the spray heads to produce droplets having a uniform or substantially constant radius between 0.2 mm and 0.3 mm, the spray heads being operated and positioned to produce a shower having a liquid-air mixing ratio of greater than 0.1, droplet drift velocity will be small and approximately 1.5 m/s, consequently significantly minimizing droplet spread or drift. A height of at least 5 meters is the preferred height of the cooling shower and also the preferred elevation of spray head members above the cooled water in reservoir 74.

In this embodiment of the present invention, spray heads analogous to those shown in FIG. 3 are used to spray water into air, an embodiment of such spray heads being shown in FIG. 6, with a cross-sectional view of one such connected spray head being shown in FIG. 7. Thus, here also perforated spray heads 70 are connected to conduit 69 substantially at its surface using connecting members 82, connecting in this manner the perforated spray head members to the water supply means as shown in FIG. 5. As specified in relation to the previous embodiment, the perforated members 83 used in the present embodiment are also preferably riveted to the inner surface of connecting members 82 which is an annular member produced preferably from conduit 69 itself in a manner similar to that explained in relation to the previous embodiment. However, also here, if convenient, other methods such as those previously described, for providing connection of the perforated spray members 83 at the surface of conduit 69 may be used. Furthermore, similar to the previous embodiment, connecting members 82 are welded to periphery of holes in conduit 69 once members 70 have been mounted thereon. The perforated spray head members have a plurality of holes 86 for producing a spray of water droplets of uniform, equal or constant radius which interacts with the air in a manner described hereinbefore. Even though a droplet radius is selected which, on the one hand is sufficiently small to permit almost all of the droplets to cool sufficiently, reaching the required temperature as they enter the catch basin, eliminating the necessity of recycling the water and sufficiently large, and on the other hand, to substantially reduce or eliminate droplet drift away from the catch basin as described hereinbefore, in addition, the size of the holes 86 is selected such that any solid material remaining in the water to be cooled will not cause blockage of the spray heads. Furthermore, the distance between the holes is also chosen in order to ensure the production of a shower of droplets having substantially uniform, equal or constant size. Preferably, the radius of holes in perforated spray members 70 is at least 0.06 mm, with the distance between the holes on the member preferably being at least 0.6 mm. Also, the area of member 83 mounted on connecting member 82 and which present a free surface to water present in conduit 69 for producing a spray of droplets preferably contains 1,000 holes within a radius of 17 mm, the radius of this area being preferably 40 mm. The preferred outer radius of conduit 69 is 30 mm. Thus, when using spray head members having holes of radius 0.12 mm, the holes being separated by a distance of 0.8 mm, a shower of droplets having a uniform radius of approximately 0.24 mm will be produced, the droplets having a settling or drift velocity of less than approximately 1.5 m/s, this being sufficient to substantially reduce drift under most ambient conditions.

Spray heads 70 operate at minimal pressures, no greater than 2 atmospheres, and their operating pressure has no influence on the size of droplets produced by it. Preferably, an operating pressure of between 0.2–1.0 atmospheres is used. Thus, the pump used to supply water to the spray heads can operate at relatively small pressures and minimize energy consumption. Also, in the present embodiment, flexibility of operation is achieved by using such spray heads since the water flow rate can be changed when necessary, as discussed above, by increasing the spray head operating pressure for example, without altering the basic characteristics of the spray shower, in particular the droplet radius and mixing ratio. Thus, for example, if the ambient wind velocity increases, larger quantities of fresh dry air are made available for the cooling process and consequently the water flow rate can be increased by increasing the spray head operating pressure permitting larger quantities of water to be cooled while at the same time maintaining a constant droplet radius.

While the above description relates to cooling water, this aspect of the present invention, shown for example in FIGS. 5 to 7 above and described also in relation thereto, is generally applicable to cooling other liquids. For example, sea and ocean water, brackish water, industrial, domestic and agricultural waste liquids and solutions as well as surplus surface waters may be cooled using the methods and apparatus of the present invention. Preferably, the perforated spray head member is constructed from material which exhibits non-corrosive behaviour to the liquids from which the spray shower is produced. Such materials include titanium, stainless steel and plastics such as teflon, polyvinylidene fluouride, etc. Also, here, if preferred, the perforated members can be manufactured using electrochemical etching or laser beam welding techniques wherein the holes are produced in the member material by, for example, a laser beam. Also, needle punching can be used. When stainless steel or titanium is used as the construction material of the spray head members, a thickness of no greater than 0.2 mm is preferred, while at least 1 mm is the preferred thickness of the members when teflon and other plastics are used as the construction material.

It is believed that the advantages and improved results furnished by the method and apparatus of the present invention are apparent from the foregoing description of the preferred embodiments of the invention. Various changes and modifications may be made without departing from the spirit and scope of the invention as described in the claims that follow.

What is claimed is:

1. Apparatus for spraying a liquid containing particles of foreign material into a gaseous medium comprising:

a) a header having an inner surface and having a plurality of spray head members mounted thereon, each of said spray head members having a surface into which a plurality of holes open for spraying droplets of said liquid into said medium, the surface of each spray head member being aligned with the inner surface of the header;

b) means for maintaining the header elevated above the ground;

c) means for supplying said header with pressurized liquid in an amount that exceeds the amount sprayed by said spray header members for producing residual liquid that is not sprayed, said residual liquid serving to continuously wash the surface on all of said spray head members with liquid flowing in the header to inhibit deposition of particles in the holes thereof; and d) a return conduit connected to said header for removing said residual liquid from the header such that liquid flowing in said header purges particles of foreign material from the holes of said spray head members.

2. Apparatus according to claim 1 wherein said spray head members are constructed and arranged so that a shower of liquid droplets is produced by said spray head members, said shower having a mixing ratio of liquid to gas less than about 0.02.

3. Apparatus according to claim 2 wherein the header is round in cross-section with a radius of at least 25 mm.

4. Apparatus according to claim 2 wherein there are at least 1500 holes in each of said spray head members.

5. Apparatus according to claim 2 wherein said means for maintaining the header is constructed and arranged to elevate the same at least 10 m from the ground.

6. Apparatus according to claim 1 wherein the holes in said spray head members are not less than about 0.03 mm, and the distance between holes is at least 0.6 mm.

7. Apparatus according to claim 1 wherein said liquid is brine.

8. Apparatus according to claim 1 wherein said liquid is agricultural waste liquid.

9. Apparatus according to claim 1 wherein the liquid is industrial waste liquid.

10. Apparatus according to claim 1 wherein said spray head members are constructed and arranged so that the radius of the droplets produced is less than about 0.2 mm.

11. Apparatus according to claim 1 wherein each of said spray head members includes a perforated sheet, and said sheet is metal.

12. Apparatus according to claim 1 wherein each of said spray head members includes a perforated sheet, and the thickness of said sheet is less than about 0.2 mm.

13. Apparatus according to claim 1 wherein each of said spray head members includes a perforated sheet, and said sheet is stainless steel.

14. Apparatus according to claim 1 wherein each of said spray head members includes a perforated sheet, and said sheet is titanium.

15. Apparatus according to claim 14 wherein each of said spray head members includes a perforated sheet, and the thickness of said sheet is at least 1 mm.

16. Apparatus according to claim 1 wherein each of said spray head members includes a perforated sheet, and said sheet is plastic.

17. Apparatus according to claim 1 wherein said spray head members are constructed and arranged such that the radius of droplets produced is substantially constant and approximately 0.1 mm.

18. Apparatus according to claim 1 wherein said spray head members are constructed and arranged so that a shower of liquid droplets is produced by said spray head members, said shower having a mixing ratio of liquid to gas of about 0.02 which is substantially constant throughout the shower of droplets.

19. Apparatus according to claim 1 wherein the radius of droplets produced is substantially constant throughout the shower and approximately 0.3 mm.

20. Apparatus according to claim 1 wherein said spray head members are constructed and arranged so that a shower of liquid droplets of substantially constant radius is produced by said spray head members, said shower having a mixing ratio greater than about 0.1 which is substantially constant throughout the shower of droplets.

21. Apparatus according to claim 1 wherein said spray head members include a perforated sheet of material having non-corrosive behavior to said liquid.

22. Apparatus according to claim 1 wherein said header is constructed from polyethylene.

23. Apparatus according to claim 1 wherein said header is constructed from polypropelene.

24. Apparatus according to claim 1 wherein said means for supplying said header with pressurized liquid are constructed and arranged so that the amount of liquid supplied to said supply conduit header exceeds the amount of liquid sprayed by said spray head members into said gaseous medium.

25. Apparatus for spraying a liquid containing particles of foreign material into a gaseous medium comprising:

a) a header having an inner surface to which a plurality of spray head members are mounted, each of said spray head members having a surface into which a plurality of holes open for receiving said liquid which is sprayed as droplets into said medium, the surface of each spray head members being aligned with the inner surface of the header;

b) means for maintaining the header elevated above the ground;

c) means for producing residual liquid that is not sprayed and for continuously washing the surface in all of said spray head members with liquid flowing in the header to inhibit deposition of particles in the holes thereof including supply means for supplying said header with pressurized liquid in an amount which exceeds the amount of liquid sprayed by said spray head members into said gaseous medium for generating liquid droplets thereby; and d) a return conduit connected to said header for removing residual liquid from the header such that liquid flowing in said header purges particles of foreign material from the holes of said spray head members.

* * * * *

UNITED STATES PATENT AND TRADEMARK OFFICE
CERTIFICATE OF CORRECTION

PATENT NO. : 5,527,494
DATED : June 18, 1996
INVENTOR(S) : Joseph Weinberg et al.

It is certified that error appears in the above-identified patent and that said Letters Patent is hereby corrected as shown below:

<u>Title page,</u>
Item [73[, please replace "Orniat" with -- Ormat --.

Signed and Sealed this

Sixteenth Day of July, 2002

Attest:

Attesting Officer

JAMES E. ROGAN
Director of the United States Patent and Trademark Office